US010288095B2

(12) United States Patent
Lamontagne et al.

(10) Patent No.: US 10,288,095 B2
(45) Date of Patent: May 14, 2019

(54) MOUNTING OF AN OPTICAL ELEMENT IN A BARREL USING A FLEXIBLE RING

(71) Applicant: INSTITUT NATIONAL D'OPTIQUE, Québec (CA)

(72) Inventors: Frédéric Lamontagne, Québec (CA); Nichola Desnoyers, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 560 days.

(21) Appl. No.: 14/861,574

(22) Filed: Sep. 22, 2015

(65) Prior Publication Data

US 2016/0084281 A1 Mar. 24, 2016

Related U.S. Application Data

(60) Provisional application No. 62/053,524, filed on Sep. 22, 2014.

(51) Int. Cl.
*G02B 7/02* (2006.01)
*F16B 2/06* (2006.01)
(Continued)

(52) U.S. Cl.
CPC ............... *F16B 2/065* (2013.01); *F16B 2/22* (2013.01); *F16B 43/004* (2013.01); *G02B 7/026* (2013.01); *G02B 7/021* (2013.01)

(58) Field of Classification Search
CPC ............. G02B 7/026; F16B 2/065; F16B 2/22
(Continued)

(56) References Cited

U.S. PATENT DOCUMENTS 2,526,433 A 10/1950 Svensson
3,142,239 A 7/1964 Meixner
(Continued)

FOREIGN PATENT DOCUMENTS

CN 203164577 U 8/2013
DE 19943452 A1 3/2000
(Continued)

OTHER PUBLICATIONS

Yoder, "Mounting Optical Components in Optical Instruments", SPIE Press Book, p. 49 (2008).
(Continued)

*Primary Examiner* — Gwendolyn W Baxter
(74) *Attorney, Agent, or Firm* — Merchant & Gould P.C.

(57) ABSTRACT

An optical assembly has an optical element mounted in the cavity of a barrel. A flexible ring is in contact with one of the surfaces of the optical element. The flexible ring has ring threads engaging barrel threads within the cavity. The flexible ring has a biased state in which the ring threads press against the barrel threads, and is resiliently deformable to a compressed state allowing screwing of the flexible ring within the cavity. In one variant, multiple subassemblies each having an optical element and a flexible ring are provided in the cavity of a barrel. The optical elements of subassemblies subsequent to the first one are supported by the flexible ring of the previous subassembly. The pressing of the ring threads against the barrel threads prevents a lateral shift of the flexible ring within the cavity, eliminating the decentering observed with conventional retaining rings.

26 Claims, 11 Drawing Sheets

(51) Int. Cl.
*F16B 2/22* (2006.01)
*F16B 43/00* (2006.01)
(58) Field of Classification Search
USPC .......................................... 359/819, 829, 830
See application file for complete search history.

(56) References Cited

U.S. PATENT DOCUMENTS

| | | | |
|---|---|---|---|
| 3,269,264 A | 8/1966 | Cocks | |
| 3,378,020 A | 4/1968 | Grabiel | |
| 3,685,392 A | 8/1972 | Platt | |
| 3,888,568 A | 6/1975 | Norris et al. | |
| 3,904,276 A * | 9/1975 | Whitaker | G02B 7/026 359/819 |
| 4,390,260 A | 6/1983 | Prinz | |
| 4,733,945 A | 3/1988 | Bacich | |
| 4,778,252 A | 10/1988 | Filho | |
| 4,805,943 A * | 2/1989 | Balsells | F16B 21/078 267/167 |
| 4,854,671 A | 8/1989 | Hanke et al. | |
| 4,883,968 A | 11/1989 | Hipple et al. | |
| 5,076,682 A | 12/1991 | Pasfield | |
| 5,121,251 A | 6/1992 | Edwards | |
| 5,177,641 A | 1/1993 | Kobayashi et al. | |
| 5,245,478 A | 9/1993 | Luecke | |
| 5,510,935 A | 4/1996 | Whitty et al. | |
| 5,926,326 A * | 7/1999 | Fischer | G02B 7/026 359/819 |
| 6,144,509 A * | 11/2000 | Baker | G02B 7/026 359/819 |
| 6,292,311 B1 | 9/2001 | Bohn et al. | |
| 6,381,081 B1 | 4/2002 | Ford | |
| 7,990,632 B2 | 8/2011 | Monti | |
| 9,244,245 B2 | 1/2016 | Lamontagne et al. | |
| 2002/0021504 A1 | 2/2002 | Bayer et al. | |
| 2002/0176180 A1 | 11/2002 | Ue et al. | |
| 2003/0076504 A1 | 4/2003 | Marcus et al. | |
| 2004/0174620 A1 | 9/2004 | Matsushima et al. | |
| 2013/0182342 A1 | 7/2013 | Chang et al. | |
| 2014/0240854 A1 | 8/2014 | Meng | |
| 2015/0131175 A1 | 5/2015 | Lamontagne et al. | |
| 2016/0025950 A1 | 1/2016 | Lamontagne et al. | |

FOREIGN PATENT DOCUMENTS

| | | |
|---|---|---|
| DE | 100 36 239 A1 | 2/2002 |
| JP | S57-210305 A | 12/1982 |
| JP | 2012173366 A | 9/2012 |
| TW | 200829951 A | 7/2008 |
| WO | 2012/008284 A1 | 1/2012 |

OTHER PUBLICATIONS

Lee et al., "Creative Optomechanical Tolerancing in Lens Systems", Proc. of the SPIE, vol. 3482, pp. 187-200, (1998).
Dewitt et al., "Rigid Body Movements of Optical Elements due to Opto-Mechanical Factors", Proc. of the SPIE, vol. 5867, pp. 1-12 (2005).
Cheng et al., "A Study on the Optomechanical Tolerance Model for Lens Assembly", Proc. of the SPIE, vol. 6665, pp. 1-8 (2007).
Burge, "Mounting of Optical Components—Mounting of Lenses", The University of Arizona, pp. 1-46 (2011).
Supplemental European Search Report for European Patent Application No. 15843774.9 dated May 25, 2018, 16 pages.

* cited by examiner

MOUNTING OF AN OPTICAL ELEMENT IN A BARREL USING A FLEXIBLE RING

This application claims benefit of U.S. Provisional Application Ser. No. 62/053,524, filed 22 Sep. 2014 and which application is incorporated herein by reference. To the extent appropriate, a claim of priority is made to the above disclosed application.

FIELD OF THE INVENTION

The present invention relates to mechanical components for optical systems and more particularly concerns an optical assembly where one or more optical elements are mounted in a barrel using a flexible ring.

BACKGROUND

Optical elements or components are omnipresent in devices, systems or arrangements where light needs to be directed, expanded, focussed, collimated or otherwise transformed or affected. Optical elements can for example be embodied by lenses, mirrors, Diffractive Optical Elements (DOE), assemblies of such elements, or the like.

In a typical optical system, most or all optical elements usually need to be precisely positioned and aligned in order to properly perform their intended optical function. This positioning and alignment typically involve securing the optical element in a holder or mount of some sort. Proper alignment of an optical element with respect to the holder is a delicate operation that generally requires tight manufacturing tolerances and careful handling.

Figure 1:
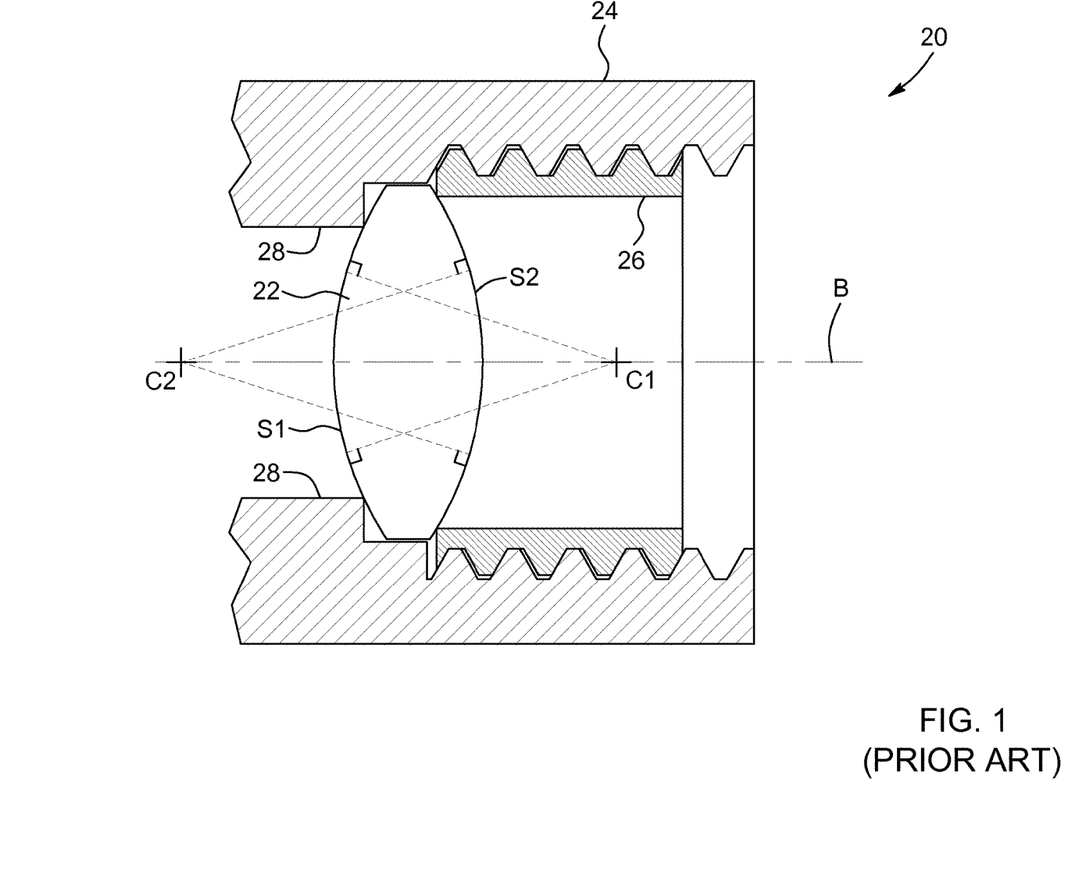
FIG. 1 (PRIOR ART) is an illustration of a lens assembly showing a biconvex lens mounted in a lens barrel according to prior art.

Barrels are well known types of mechanical holders for optical elements. Barrels typically define a cylindrical cavity in which one or more optical elements are mounted. By way of example, a lens is a type of optical element that is often mounted in barrels. A lens generally needs to be centered with a precision that can be of the order of a few micrometers. Opto-mechanical assemblies in which lenses are mounted and precisely centered are known in the art. Referring to FIG. 1 (PRIOR ART), there is shown a typical assembly 20 including a lens 22, a barrel 24 and a retaining ring 26. The lens 22 is mounted in the barrel 24 with the periphery of one of its surfaces S1 in contact with a lens seat 28. The retaining ring 26 is typically threaded within the barrel 24 and abuts on the surface S2 of the lens 22 opposite to the lens seat 28, thus securing the lens 22 in the assembly 20. It is well known in the art that the lens is centered when the centers of curvature C1 and C2 of both surfaces S1 and S2 lie on the center axis B of the lens barrel 24.

The technique consisting in inserting a lens in a lens barrel and then securing the lens with a threaded ring is generally referred to as the "drop-in" lens technique. The centering precision obtained from this technique first depends on the minimum allowable radial gap between the lens and the barrel. Thermal effects caused by the mismatch of the respective coefficients of thermal expansion of the lens and barrel materials also have an impact on the centering of the lens. Manufacturing tolerances on dimensions of the components of the assembly such as the diameter of the lens, the diameter of the barrel cavity and the differences in thickness along the edge of the lens also affect the quality of the centering. The greater the precision required on the centering of the lens, the greater the manufacturing costs of both lens and barrel.

The main advantages of the drop-in technique are that the assembly time can be very short and that the lenses are removable. Low cost drop-in has, however, the drawback of a lower centering precision. The drop-in method may not be suitable when higher precision is required, and then an active alignment is typically chosen. In this centering method, the lens is first positioned inside the cavity and its decentering relative to the center axis of the barrel is measured. The lens is then moved to reduce the centering error. These steps can be repeated several times until the alignment of the lens complies with the centering requirements.

Once centered, the lens is fixed in place with adhesive or other means. This method provides a very high level of centering accuracy, but requires expensive equipment while being time-consuming.

While the discussion above concerns mainly lenses, other types of optical elements can be mounted in a barrel using a retaining ring, and such elements are confronted with the same issues discussed above.

There therefore remains a need for an approach to mount an optical element in a barrel which alleviates at least some of the drawbacks of known techniques.

SUMMARY

In accordance with one aspect, there is provided an optical assembly including a barrel defining a cavity, the barrel having an inner wall provided with a set of barrel threads. The optical assembly further includes an optical element mounted in the cavity and having opposite first and second surfaces, and a flexible ring having an abutment peripherally engaging one of the first and second surfaces. The flexible ring has an outer perimeter provided with a set of ring threads engaging the barrel threads. The flexible ring further has a biased state in which the ring threads press against the barrel threads. The flexible ring is resiliently deformable to a compressed state in which an engagement of the ring threads and barrel threads allows screwing of the flexible ring within the cavity.

In some implementations, the flexible ring may include a gap, at least one compressible portion or at least one resilient insert along a section thereof.

In accordance with another aspect, there is also provided an optical assembly having a barrel defining a cavity, the barrel having an inner wall provided with a set of barrel threads, and a seat provided in the cavity. The optical assembly further includes a plurality of optical subassemblies mounted in a cascade within the cavity. Each subassembly includes:

- an optical element mounted in the cavity and having opposite first and second surfaces;
- a flexible ring having an abutment peripherally engaging the second surface, the flexible ring having an outer perimeter provided with a set of ring threads engaging the barrel threads, the flexible ring having a biased state in which the ring threads press against the barrel threads, the flexible ring being resiliently deformable to a compressed state in which an engagement of the ring threads and barrel threads allows screwing of said flexible ring within the cavity.

The seat engages the first surface of an innermost one of the optical elements, and the first surface of each subsequent ones of the optical elements is supported by the flexible ring of the previous subassembly within said cascade.

In accordance with yet another aspect, there is provided an optical assembly, including a barrel defining a cavity, the barrel having an inner wall provided with a set of barrel threads, and one or more optical subassemblies. Each optical subassembly includes:

an optical element mounted in the cavity and having opposite first and second surfaces;

a flexible ring having an abutment peripherally engaging one of the first and second surfaces, the flexible ring having an outer perimeter provided with a set of ring threads engaging the barrel threads, the flexible ring having a biased state in which the ring threads press against the barrel threads, said flexible ring being resiliently deformable to a compressed state in which an engagement of the ring threads and barrel threads allows screwing of said flexible ring within the cavity.

Other features and advantages of the invention will be better understood upon a reading of embodiments thereof with reference to the appended drawings.

DETAILED DESCRIPTION OF EMBODIMENTS

The description below relates to optical assemblies where one or more optical elements are mounted in the cavity of a barrel.

Referring to FIGS. 2, 3 and 3A to 3C, there is shown an optical assembly 20 according to one embodiment. The optical assembly 20 includes a barrel 24 defining a cavity 32, and an optical element 22 mounted in the cavity 32.

Figure 2:
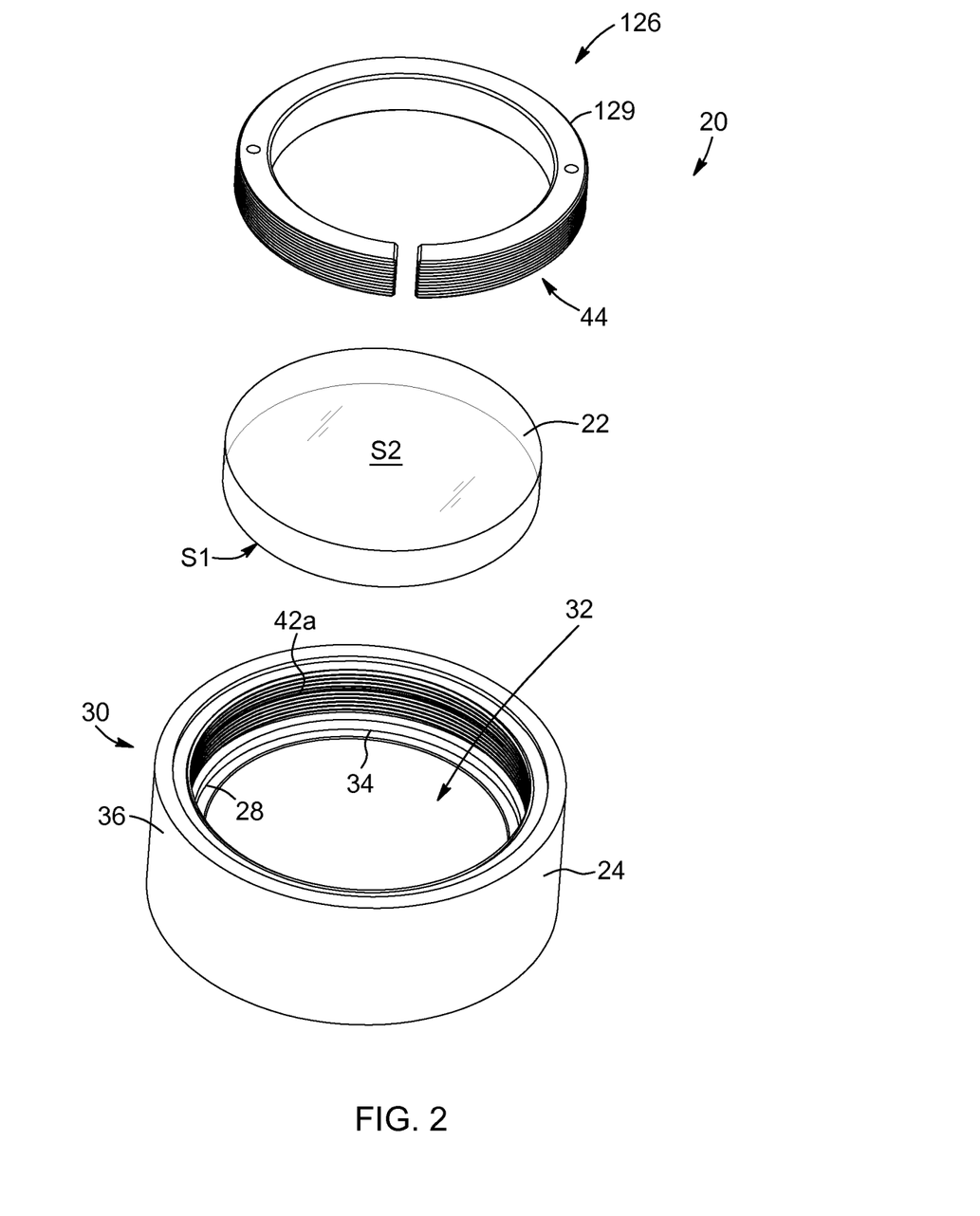
FIG. 2 is an exploded isometric view of an optical assembly according to one embodiment.
Figure 3:
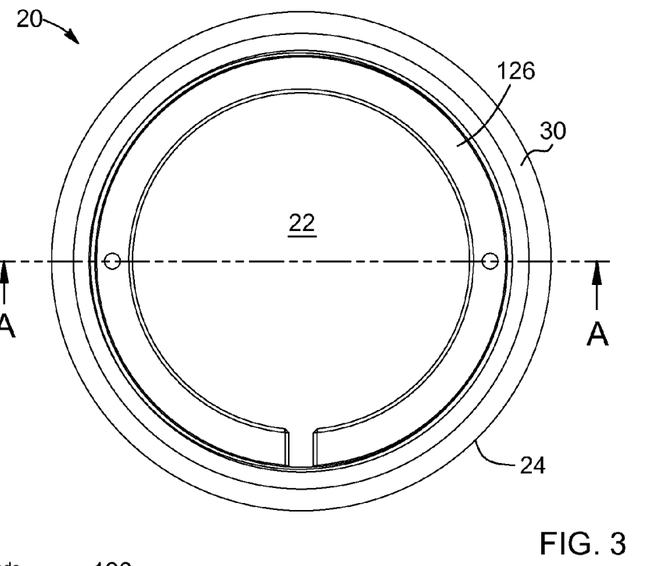
FIG. 3 is a schematic top view of the optical assembly of FIG. 2.
Figures 3A, 3B, 3C:
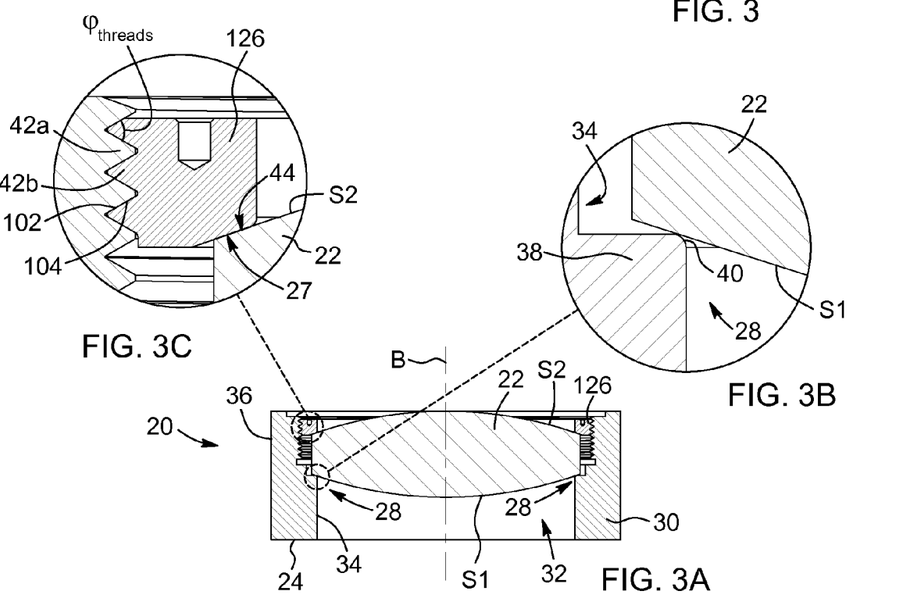
FIG. 3A is a cross-sectional view taken along line AA of FIG. 3.
FIG. 3B is an enlarged view of a portion of FIG. 3A showing the engagement of the first surface of the optical element on the seat of the barrel.
FIG. 3C is an enlarged view of a portion of FIG. 3A showing the engagement of the ring threads with the barrel threads.

The barrel 24 may be embodied by any housing structure in which an optical element 22 is to be mounted, aligned and secured in position. Typical barrels such as the ones illustrated herein include a hollow cylindrical housing 30 having an inner wall 34 and an outer wall 36. The inner wall 34 of the barrel 24 is provided with a set of barrel threads 42a, which will be described further below. The hollow portion of the cylindrical housing 30 forms the cavity 32, which may have any shape adapted to receive the optical element 22 therein. The cavity 32 has a center axis B, defined as its symmetry axis.

It will be readily understood that the barrel 24 may have any shape, mechanical features or additional components adapted to engage, connect to or otherwise interact with other structures as required by the context in which the optical element 22 is to be used. For example, the outer wall 36 of the barrel may be provided with threads, holes, pins, projections, flanges and the like without departing from the scope of the invention. Alternatively, the barrel 24 may be an integral part of a larger optical assembly, such as for example a camera objective or a microscope objective.

In the illustrated example of FIGS. 2, 3 and 3A to 3C, the optical element 22 is a biconvex lens. However, in other implementations the optical element 22 may be any component or group of components acting on light in some fashion, for example to direct or change the direction of a light beam, focus or expand, collimate, filter, or otherwise transform or affect light. Examples of optical elements include lenses of any type, such as for example, planoconvex, biconvex, plano-concave, biconcave, positive or negative meniscus lenses. Cemented doublet or triplet lenses of the types listed above can also be centered according to the present description. The optical element may also be embodied by diffractive lenses, mirrors, diffractive optical elements (DOEs), pinholes, or the like. The optical element may have spherical or aspherical surfaces and may have an off-axis profile. In other embodiments, the optical element may be embodied by a more complex subassembly of optical components such as for example one or more lenses mounted in a sleeve, a mirror or a lens mounted in a spider, a lens or a lens barrel mounted in an optical mount which is itself mounted on an optical bench, etc.

The optical element 22 has opposite first and second surfaces S1 and S2. It will be noted that throughout the present description, the "first" surface S1 denotes by convention the surface facing away from the opening of the cavity through which the optical element has been inserted, that is, the surface being inserted first when mounting the optical element in the barrel. The "second" surface S2 therefore extends on the side of the opening of the cavity from which the optical element has been inserted. It will be understood that this convention is used for ease of reference only and is not meant to confer any particular ranking or preferred orientation or characteristics to either surface.

The optical assembly 20 further includes a flexible ring 126. The flexible ring 126 has an abutment 44 peripherally engaging either the first surface S1 or the second surface S2 of the optical element 22. In the illustrated embodiment of FIGS. 2, 3 and 3A to 3C, the abutment 44 of the flexible ring 126 engages the second surface S2, and the optical assembly 20 includes a seat 28 provided in the cavity 32 and engaging the first surface S1 of the optical element 22. The optical element 22 is therefore secured between the seat 28 and the flexible ring 126. In other implementations, the abutment of the flexible ring may engage the first surface S1 of the optical element, the abutment thereby defining a seat for the optical element. Such an embodiment will be described further below.

Referring more particularly to FIGS. 3A and 3B, in some embodiments the seat 28 may be defined by an annular shoulder 38 formed in the inner wall 34 of the barrel 24 projecting inwardly within the cavity 32. As best seen in FIG. 3B, in the illustrated embodiment the shoulder 38 is shown as forming a right angle with respect to the inner wall 34 of the barrel 24, such that the first surface S1 rests on the corner edge 40 of the shoulder 38. Optionally, as illustrated, the corner edge 40 can be rounded or bevelled by polishing or machining to avoid damaging the first surface S1 of the optical element 22. It will be readily understood that in other embodiments the contact between the first surface S1 and the seat 28 may be different, and can for example be an edge contact, a tangential contact, a toroidal contact or a spherical contact. Furthermore, in some embodiments the seat 28 need not extend along the entire circumference of the inner wall 34 of the barrel but may include missing portions or other discontinuities, or may be embodied by a plurality of radially aligned projections spaced apart along the inner wall. In other implementations, the seat 28 may be embodied by a separate element affixed to the barrel, such as for example a ring-shaped component screwed to the barrel or otherwise affixed to the barrel.

Referring more particularly to FIG. 3C, the abutment 44 of the flexible ring 126 may for example be defined by a bevelled inner edge of the flexible ring 126 which contacts a peripheral region 27 of the second surface S2 of the optical element 22. Optionally, as illustrated in the embodiment of FIG. 3C, the abutment 44 may include in a rounded corner to avoid damaging the second surface S2. However, in other embodiments the abutment may have a straight edge shape. Various types of engagements may be considered, such as for example an edge contact, a tangential contact, a toroidal contact or a spherical contact. It will be readily understood that the abutment 44 may alternatively be embodied by different structures allowing a suitable contact between the flexible ring 126 and the peripheral region 27 of the second surface S2. For example, in some assemblies the abutment 44 may have an irregular shape providing distributed discrete points of contact with the peripheral region of the second surface S2.

In typical implementations where the optical element 22 is secured between the seat 28 and the flexible ring 126, the optical assembly 20 allows for some movement of the first surface S1 of the optical element relative to the seat 28 and of the second surface S2 of the optical element relative to the abutment 44 of the flexible ring 126. As will be readily understood by one skilled in the art, this implies that the optical element 22 meets the so-called "self-centering" criterion known in the art. Self-centering refers to the capacity of the optical element 22 to roll or slide on the seat 28. One skilled in the art would therefore call "self-centered" an optical element that has a coefficient of friction with respect to the seat and flexible ring sufficiently small to allow a rolling or other movement of the optical element during tightening of the flexible ring. As for example known from Paul Yoder Jr., "Mounting Optics in Optical Instruments", SPIE Press (2008), the threshold for the coefficient of friction can be expressed as:

$$\mu \leq \left| \frac{Y_{c1}}{2R_1} + \frac{Y_{c2}}{2R_2} \right| \quad (1)$$

where:
$\mu$ is the coefficient of friction between the optical element and the seat or flexible ring;
$Y_{c1}$ is the half-diameter of contact of the first surface S1 of the optical element with the seat;
$Y_{c2}$ is the half-diameter of contact of the second surface S2 of the optical element with the flexible ring;
$R_1$ is the radius of curvature of the first surface of the optical element; and
$R_2$ is the radius of curvature of the second surface of the optical element.

It is to be noted that in equation (1) the radius of curvature of each surface has a positive value for convex surfaces and a negative value for concave surfaces.

Referring to FIG. 2, 3, 3A and more specifically to FIG. 3C, the flexible ring 126 has an outer surface 129 around its perimeter provided with a set of ring threads 42b. The ring threads 42b engage the barrel threads 42a when the flexible ring 126 is inserted into the cavity 32 of the barrel 24.

The expression "threads" is meant to refer to engageable helicoidal projections on two components allowing one component to be screwed on or within the other. By convention, a single thread is generally considered to be the portion of a helicoidal projection corresponding to one screw turn, whereas the length of the projection defining the entire screw path is referred to as threading or a set of threads. As explained above, the barrel threads 42a are disposed along the inner wall 34 of the barrel 24 whereas the ring threads 42b are along the outer perimeter 129 of the flexible ring 126, such that the flexible ring can be screwed inside the cavity 32. It will be readily understood that either set of threads 42a, 42b need not be continuous along the entire screw path, but may include missing segments or other discontinuities as long as sufficient contact points are provided to allow engagement of the barrel and ring threads.

The barrel threads 42a and ring threads 42b have complementary thread profiles. The expression "thread profile" refers to the cross-sectional shape, angle and pitch formed by the threads of a given set. By definition, the thread angle is the angle formed by the opposite walls of a thread, while the pitch of a thread set is the spacing between two consecutive crests in a set of threads. By «complementary», it is understood that the profiles of the barrel threads 42a and ring threads 42b are such that they can be screwed together, which usually involves a same pitch. In various implementations of the present optical assembly, various thread profiles may be used for the barrel and ring threads 42a, 42b. By way of example, in the illustrated embodiment of FIG. 3C a triangular profile having a thread angle $\varphi_{threads}$ of 60° is shown, which is representative of a common thread standard. A thread angle of 55° is also commonly used for mounting optical components, although other thread angles may also be used. In common variants, the thread profile may have a trapezoidal shape, the crests and grooves of the threads may have a rounded profile, or the crest of each thread may be truncated. In other variants, the thread profiles may be non-symmetrical, that is, the opposite walls of a thread may be oriented at different angles with respect to a plane perpendicular to the center axis of the cavity, as explained in further details below. Of course, the shapes and thread angles mentioned herein are given by way of example only and should not be construed as exhaustive representations of possible thread profiles.

As explained above, it is desirable for many applications to center the optical element in the cavity with great precision. In optical assemblies such as shown in FIGS. 2, 3 and 3A to 3C, the alignment of the optical element 22 within the cavity 32 is impacted by both the engagement of the first surface S1 with the seat 28, and the engagement of the second surface S2 with the flexible ring 126.

One skilled in the art will understand that the centering error of the surface S1 according to the center axis B of the barrel 24 depends on the concentricity of the seat 28 and on any manufacturing error in its perpendicularity relative to the center axis B. In some implementations, these manufacturing errors can be kept very low by using suitable manufacturing practices. For example, currently-available techniques can provide centering errors typically less than 5 μm.

On the side of its second surface S2, the alignment of the optical element 22 within the cavity is in direct relation with the position and orientation (tilt) of the flexible ring 126 within the cavity. For prior art assemblies of the type shown in FIG. 1 (PRIOR ART), on the one hand, the retaining ring 26 has a lateral play within the cavity 32, allowing its center to be shifted laterally by a few tens of micrometers on either side of the center axis B. This is referred to as the decentering of the retaining ring. On the other hand, a decentered threaded retaining ring 26 will also have an inherent tilt with respect to the center axis B of the cavity, resulting from the sloped faces of the barrel and ring threads. Both decentering and tilt of the retaining ring 26 contribute to the centering error of the second surface S2 of the optical element 22.

Figure 4A:
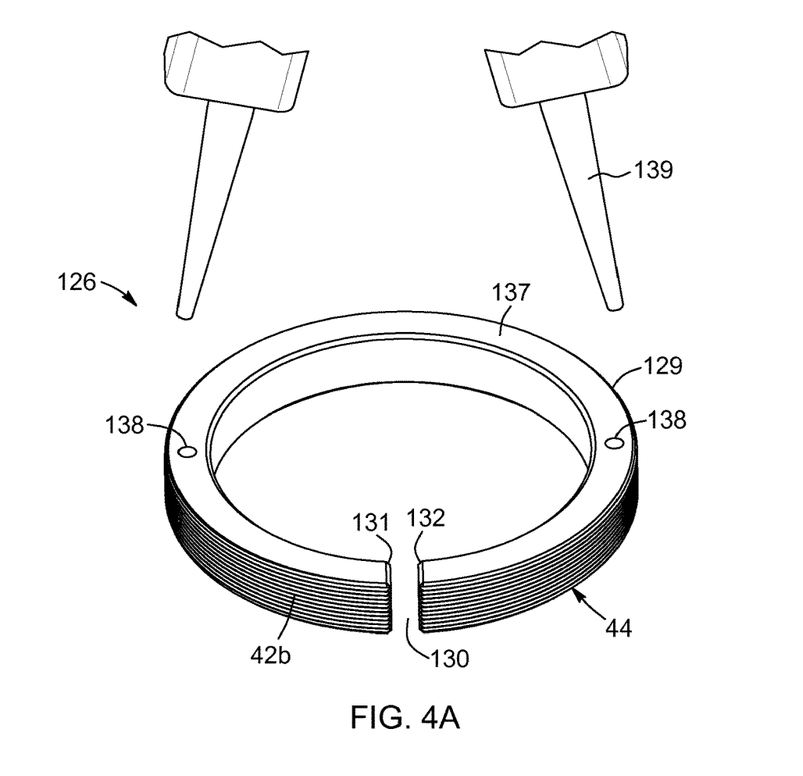
FIGS. 4A and 4B are isometric views of a flexible ring having a gap therein, respectively shown in a biased state and in a compressed state.

Referring to FIGS. 4A and 3C, in accordance with one aspect, the flexible ring 126 has a biased state in which the ring threads 42b press against the barrel threads 42a. In other words, in the biased state the flexible ring 126 extends transversally across the full extent of the cavity 32, so that the tips of the crests of the ring threads 42b contact the deepest points of the grooves of the barrel threads 42a.

As will be readily understood by one skilled in the art, the pressing of the ring threads against the barrel threads prevents a lateral shift of the flexible ring 126 within the cavity, therefore eliminating the decentering observed with conventional retaining rings. The centering error imposed on the optical element 22 when secured by the flexible ring 126 can therefore be minimized. Additionally, it can be shown that the tilt of a retaining ring is intrinsically linked to its lateral decentering, and that the relationship between these two factors can be expressed as follows:

$$\theta_{ring} = \sin^{-1}\left[\frac{2\Delta_{ring}\tan\left(\frac{\varphi_{threads}}{2}\right)}{d_{ring}}\right] \quad (2)$$

where:
$\theta_{ring}$(degrees) is the tilt of the retaining ring;
$\Delta_{ring}$(mm) is the lateral decentering of the retaining ring;
$\varphi_{threads}$(degrees) is the thread angle of the ring and barrel threads; and
$d_{ring}$ (mm) is the major diameter of the retaining ring (measured at the thread crest).

It will be readily observed that by minimizing the lateral decentering $\Delta_{ring}$, the tilt $\theta_{ring}$ is also minimized. The use of a flexible ring having a biased state in which the ring threads 42b press against the barrel threads 42a can therefore significantly reduce the centering error imposed on the optical element 22 by the flexible ring 126 when compared to conventional retaining rings known in the art.

Figure 4B:
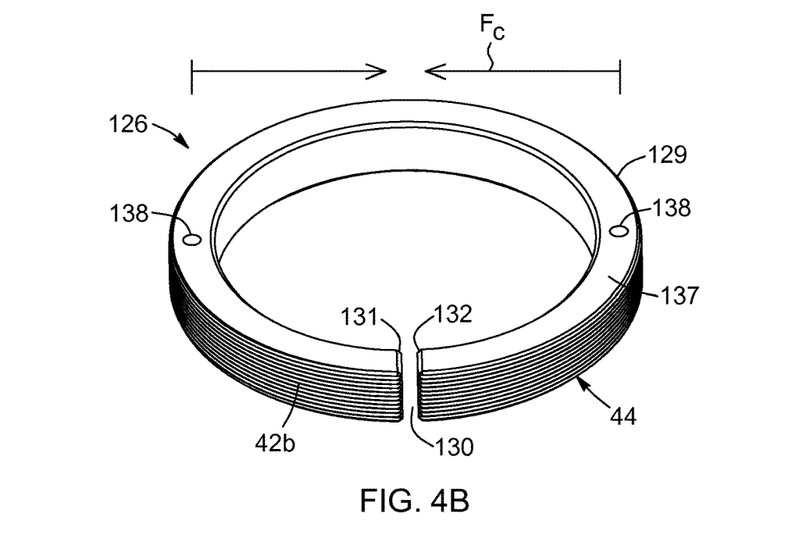

With reference to FIG. 4B, the flexible ring 126 is also resiliently deformable to a compressed state in which the engagement of the ring threads and barrel threads allows screwing of the flexible ring 126 within the cavity. Advantageously, by temporarily reducing the diameter of the flexible ring 126, this flexible ring can be inserted in the cavity and rotated with the ring threads engaged with the barrel threads, which would be difficult or impossible when the flexible ring is in the biased state. When in the compressed state, the flexible ring 126 can therefore be screwed in the cavity until it reaches the desired position, where it abuts on the second surface of the optical element to secure it. Once released from the compressed state, the spring constant of the flexible ring tends to bias the flexible ring, so that the ring threads press on the barrel threads, therefore eliminating the lateral play on the position of the flexible ring.

Still referring to FIGS. 4A and 4B, in accordance with one implementation the flexible ring 126 may include a gap 130 machined along a section thereof. The flexible ring is preferably made of a resilient material such as metals or plastics. Preferably, the material of the flexible ring has a spring constant allowing for the ring to be compressed and resiliently return to the biased position with an outward radial force sufficient to remove the diametric clearance between the flexible ring 126 and the barrel threads 42a.

It will be readily understood that the physical parameters of the flexible ring 126 such as its constituting material or materials, dimensions, and overall profile may be selected to optimize its spring constant in view of the desired biased and compressed states. On the one hand, a large spring constant may result in a large biasing force against the barrel threads which could lead to damages to the barrel threads and or ring threads. On the other hand, a low spring constant may be insufficient to hold the flexible ring in place within the cavity, leading to the potential of misalignment and in the worst case disengagement of the ring threads from the barrel threads. One skilled in the art will be able to find the suitable spring constant for a given implementation in view of the parameters of a particular optical assembly.

The flexible ring 126 may additionally be designed so as to ensure a maximal circularity of the flexible ring 126 in both biased and compressed states. As will be readily understood by one skilled in the art, manufacturing a complete ring made up of a resilient material and subsequently removing a small section to create a gap typically results in a slight widening of the gap. In some implementations, the flexible ring preferably has a nominal diameter prior to the gap being formed which is equal or very close to the diameter of the cavity 32 (the nominal diameter of the flexible ring being measured from crest-to-crest of the ring threads on opposite sides of the flexible ring whereas the diameter of the cavity is measured from the deepest point of grooves of the barrel threads on opposite sides of the cavity). This may avoid the flexible ring taking an oval shape when in either the biased or the compressed state.

As shown in FIGS. 4A and 4B, the flexible ring 126 may include one or more tool-engaging structure provided on a surface 137 of the flexible ring 126 facing outwardly of the cavity. The tool-engaging structures may provide a hold for a snap ring tool or pliers or other similar devices. Once engaged with the tool-engaging structures, the tool may be used to apply a compressing force $F_c$ on the flexible ring 126, deforming it to its compressed state, and then impose a rotational movement allowing the screwing of the flexible ring 126 within the cavity. Once the flexible ring is close to its final position, the compressing force may be discontinued, releasing the flexible ring to expand to its biased state, and the tool disengaged from the tool-engaging structures. Of course, the reverse procedure may be used to unscrew the flexible ring from the cavity if needed. Such embodiments may advantageously reduce friction between the barrel threads and ring threads during the insertion of the flexible ring. By way of example, in the illustrated embodiments the tool-engaging structures are implemented by a pair of engagement holes 138 symmetrically disposed on the surface 137 with respect to the gap 130. The tool-engaging structures may alternatively be embodied by notches, protrusions, hooks, or by any other structure which may serve the purpose of interacting with a tool to set the flexible ring 126 in a compressed state that will allow screwing or unscrewing it within the cavity. It will however be readily understood that the use of a tool and the provision of tool-engaging structures are not essential to the present invention.

Figure 5A:
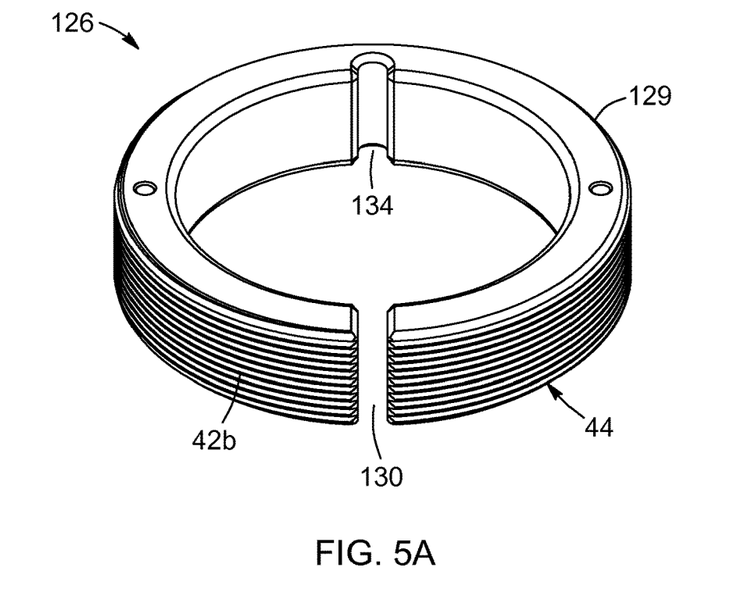
FIGS. 5A and 5B are isometric views of flexible rings respectively having a compressible portion and a resilient insert.
Figure 5B:
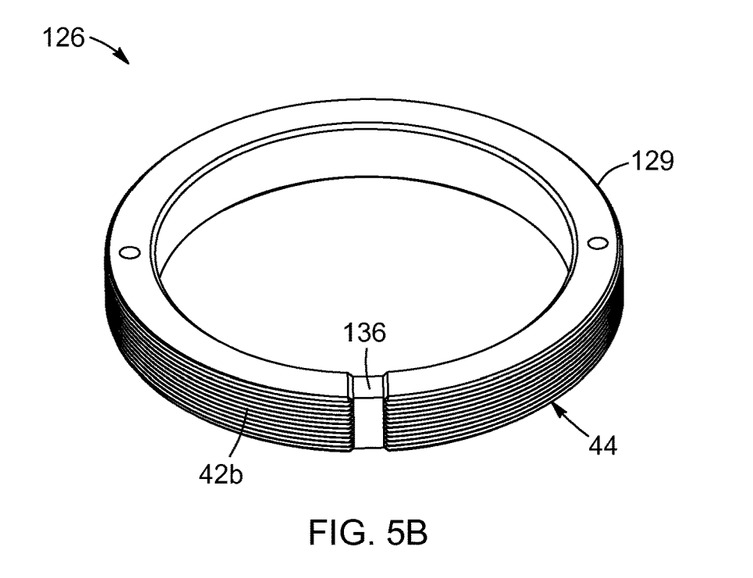

Referring to FIG. 5A, there is shown another implementation of the flexible ring 126 where a compressible portion 134 is provided along a section of the flexible ring 126 opposite to the gap 130. The compressible portion 134 may for example be provided by weakening the corresponding section of the flexible ring 126 to reduce its rigidity, therefore allowing the compression of the flexible ring 126. In the illustrated implementation, the compressible portion 134 is for example embodied by a circular notch made into the inner surface of the flexible ring 126. In other variants, multiple compressible portions may be provided at different positions along the flexible ring. FIG. 5B shows yet another variant where the flexible ring 126 includes at least one resilient insert 136 along a section thereof. The resilient insert 136 may for example be a segment of a material of greater resiliency than the remainder of the flexible ring 126. In one implementation, a section of the flexible ring 126 may be removed, creating a gap, which is subsequently filled by the resilient insert 136.

Figure 5C:
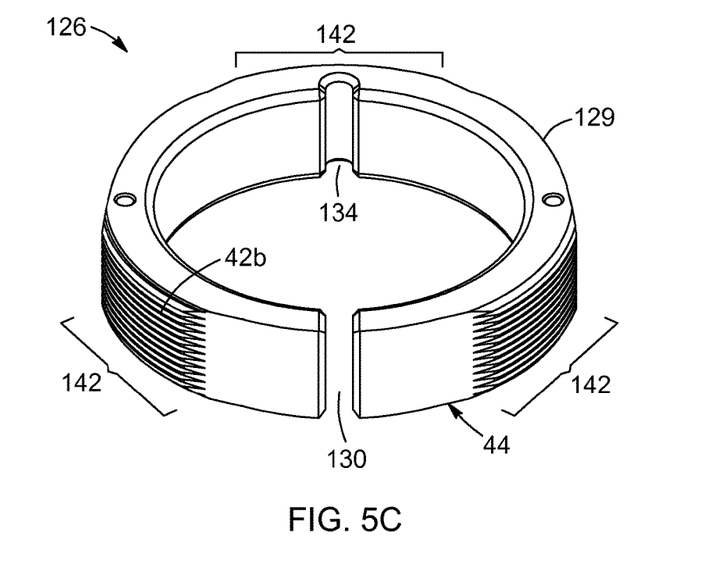
FIGS. 5C and 5D are respectively an isometric view and a top view of a resilient ring where the ring threads are split into three ring thread segments.
Figure 5D:
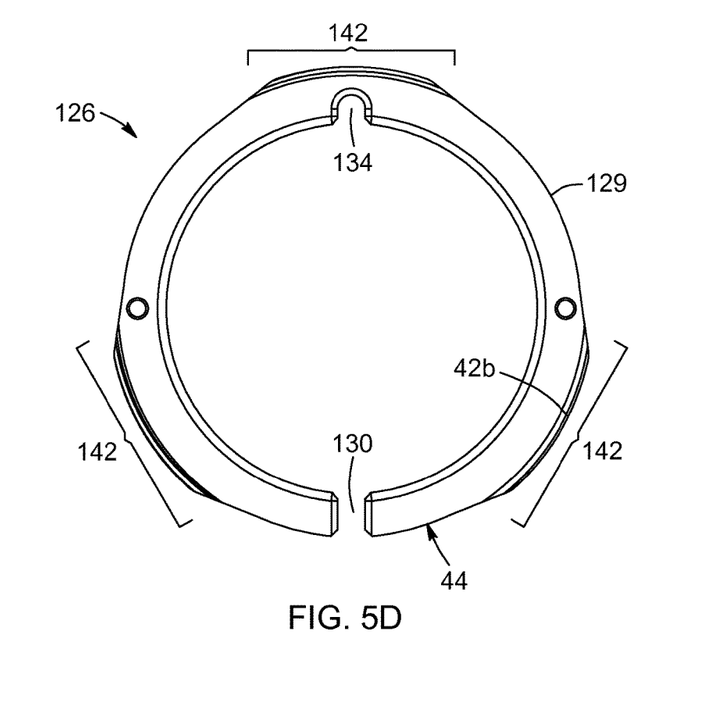

Referring to FIGS. 5C and 5D, there is shown yet another variant of a flexible ring 126. In this variant, as with the embodiment of FIG. 5A, the flexible ring includes a gap 130 and a compressible portion 134 diametrically opposed to the gap. The ring threads 42b are distributed around the flexible ring 126 according to three ring thread segments 142 projecting outwardly from the outer surface 129 of the flexible ring 126. In the illustrated example, one of the ring thread segments is disposed along the section of the ring in which the compressible portion 134 is provided, whereas the other two ring thread segments 142 are positioned on either sides of the gap 130. Preferably, the ring thread segments 142 are equidistant at about 120° from each other, although a non symmetrical or irregular distribution may be considered as well. Such an embodiment may advantageously provide a more circular configuration of the ring threads 42b. Although three ring thread segments are illustrated in FIGS. 5C and 5D, one skilled in the art will understand that the flexible ring 126 may comprise a different number of ring thread segments.

Referring back to FIGS. 2, 3 and 3A to 3C, in the illustrated optical assembly, when the flexible ring 26 is screwed within the cavity 32 of the barrel 24 and abuts on the optical element 22, the resulting mechanical forces in the system typically act to push the flexible ring 126 away from the optical element 22. In the illustrated reference frame of FIG. 3C, it can be seen that the barrel 24 and the flexible ring 126 are engaged in such a manner that the top surface 104 of each ring thread 42b pushes against the bottom surface 102 of a barrel thread 42a that faces it. It will be understood that the reference to "top" and "bottom" directions is used herein as shorthand for ease of reference to FIG. 3C, and is not meant to impart any preferential orientation to the optical assembly. As the load of the engagement between the barrel and ring threads is borne by the top surface 104 of the ring threads 42b and the bottom surface 102 of the barrel threads 42b, these latter surfaces are deemed to be the "load-bearing" faces of the threads.

Figure 6:
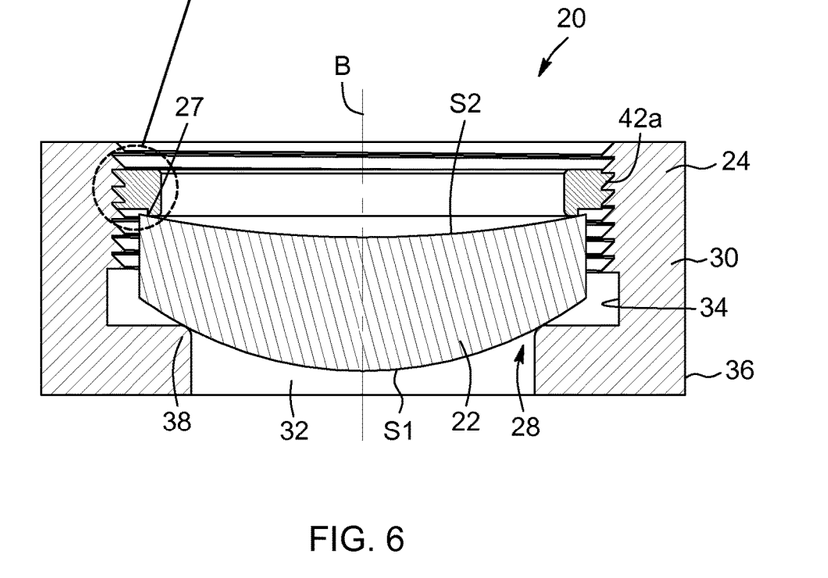
FIG. 6 is a cross-sectional view of an optical assembly according to one embodiment where the barrel threads and ring threads each have a load-bearing thread face perpendicular to the center axis of the cavity.
Figure 6A:
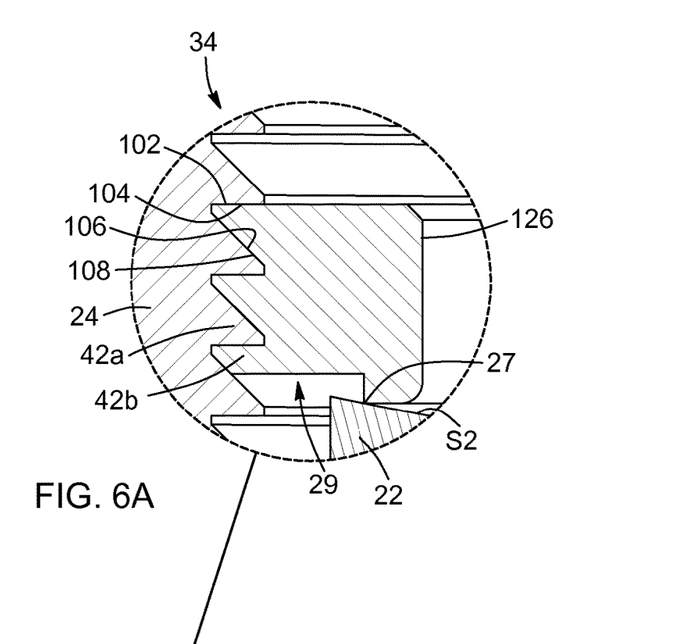
FIG. 6A is an enlarged view of a portion of FIG. 6 showing the engagement of the ring threads with the barrel threads.

Referring to FIGS. 6 and 6A, in some implementations, the thread profiles of the barrel and ring threads 42a and 42b are such that their load-bearing faces 102 and 104 are perpendicular to the center axis B of the cavity. In the reference frame of FIG. 6, the load-bearing faces therefore extend horizontally. It can also be said that the load-bearing thread faces 102 and 104 are perpendicular to the screw direction of the flexible ring 126 within the barrel 24, since this direction is parallel to the center axis B of the cavity. In the illustrated embodiment, the thread faces 106, 108 opposite to the load-bearing faces are slanted, making an acute angle of about 45° with the load-bearing thread faces 102, 104. The resulting threads are otherwise known in the art as "Buttress" threads. Of course, the slanted thread faces 106, 108 could have an angle differing from 45° without departing from the scope of the invention. Advantageously, in assemblies using threads with load-bearing faces perpendicular to the center axis B of the cavity, there are no radial forces applied to the flexible ring 126 by the orientation of the barrel and ring threads, ensuring that the threads remain engaged. Additionally, such a thread profile can reduce the tilt on the flexible ring and the corresponding contribution on the decentering of the optical element. Further details on the use of such a type of threads in optical assemblies is provided in U.S. patent application Ser. No. 14/803,865 (LAMONTAGNE), filed on Jul. 20, 2015 and entitled "Optical assemblies with tilt-controlled mounting of an optical element in a barrel", the entire contents of which being incorporated herein by reference.

Figure 7:
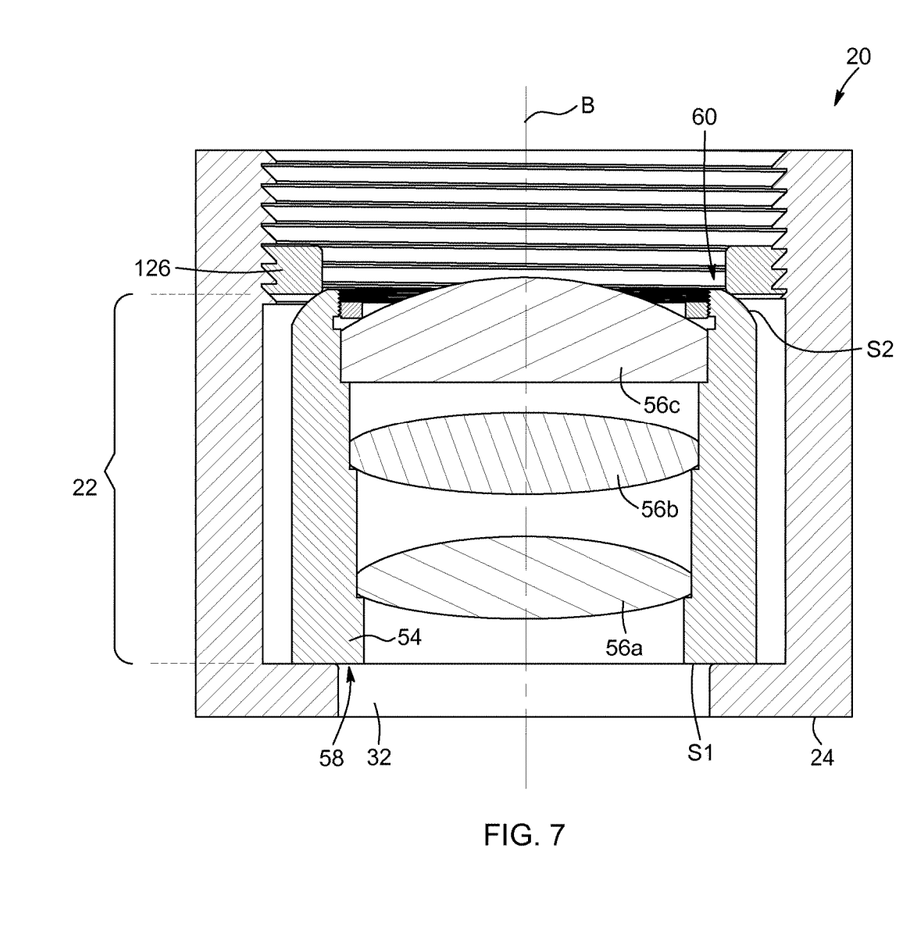
FIG. 7 is a schematic illustration of an optical assembly according to one embodiment, where a sleeve is mounted in the cavity using a flexible ring.

Referring to FIG. 7, there is shown an embodiment of an optical assembly 20 where the optical element 22 is embodied by a sleeve 54 inserted inside the cavity 32 of the barrel 24 and held therein by the flexible ring 126. The sleeve has opposite lower and upper ends 58 and 60 respectively defining the first and second surfaces S1 and S2.

One or more optical components 56a, 56b, 56c can be mounted in the sleeve 54. Although three such optical components 56a, 56b, 56c are shown in FIG. 7, it will be readily understood that in different variants the number of optical components may vary. Each optical component 56a, 56b, 56c may for example be embodied by a lens, a curved mirror, a diffractive optical element, a pinhole or the like. Preferably, each optical component 56a, 56b, 56c is centered with respect to the sleeve 54, such that proper centering of the sleeve 54 in the cavity 32 will in turn center the optical components 56a, 56b, 56c with respect to the center axis B of the cavity 32. In various implementations, the optical components 56 may be mounted in the sleeve 54 using the common "drop-in" approach, and may be held in place using a threaded ring, a snap ring, a flexure, an elastomeric retainer, a burnished edge or any other suitable means. In some embodiments, one or more of the optical components may be auto-centered within the sleeve 54 using a threaded retaining ring 26 in accordance with the principle explained in U.S. Pat. Appl. Pub. No. US 2015/0131175 (LAMONTAGNE et al.), and entitled "Auto-centering of an optical element within a barrel", the entire contents of which being incorporated herein by reference. The optical components 56 may also be centered according to a different technique, for example an active alignment followed by bonding of the optical components.

Figure 8:
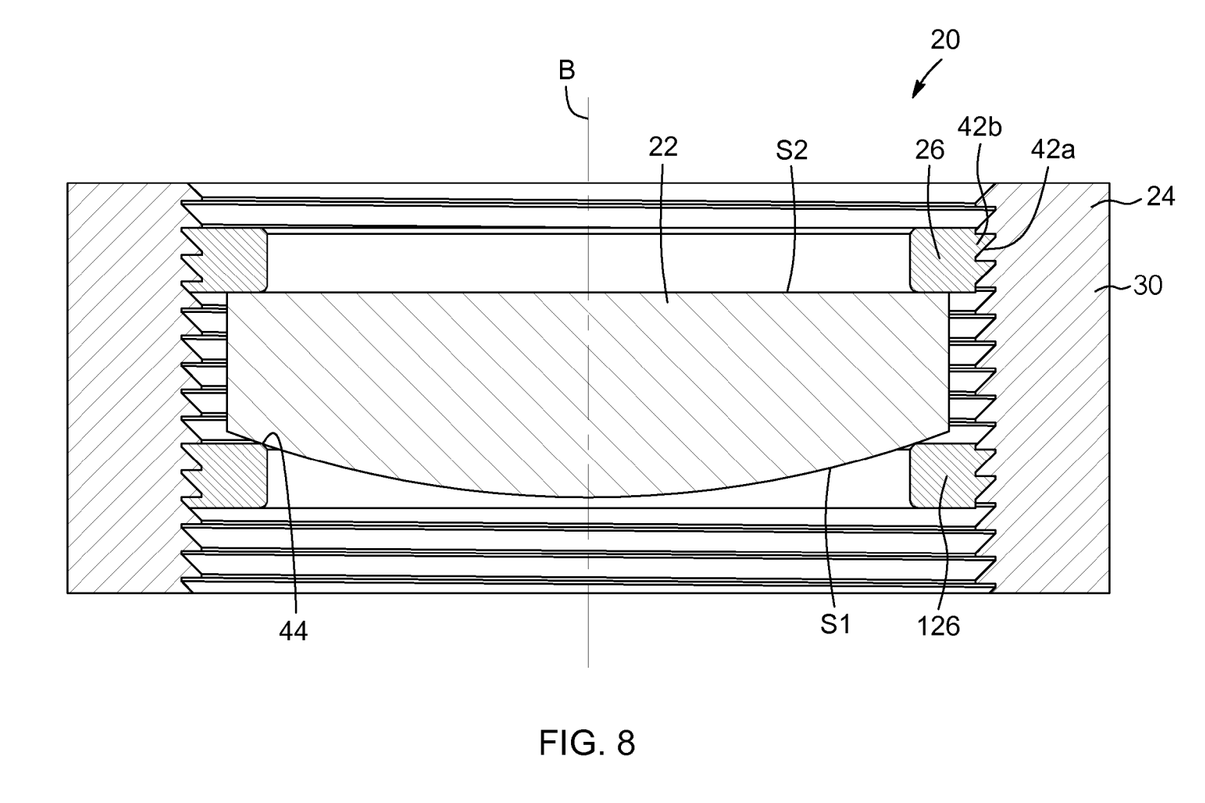
FIG. 8 is a schematic illustration of an optical assembly according to one embodiment, where a flexible ring is used as a seat for an optical element.

Referring to FIG. 8, there is illustrated an optical assembly 20 according to another implementation. In this embodiment, the abutment 44 of the flexible ring 126 engages the first surface S1 of the optical element 22. The abutment 44 therefore defines a "seat" for the optical element 22. Advantageously, using a flexible ring 126 having a biased state in which the ring threads 42b press against the barrel threads 42a mitigates the centering error on the seat, thereby limiting the contribution of the seat to the overall decentering of the optical element 22. In the illustrated embodiment, a retaining ring 26 engages the second surface S2 of the optical element 22, to secure the optical element 22 between the flexible ring 126 and the retaining ring 26. The retaining ring may engage the second surface S2 of the optical element 22 and the barrel threads 42a in one of several manners preserving the centering of the optical element 22 within the cavity. In the illustrated embodiment of FIG. 8, the second surface S2 is planar and the barrel threads 42a and the ring threads 42b have load-bearing faces perpendicular to the center axis B of the cavity. In other variants, for example where the second surface is convex, the engagement of the retaining ring 26 and the second surface S2 may meet an auto-centering condition as explained in the abovementioned U.S. Pat. Appl. Pub. No. US 2015/0131175 (LAMONTAGNE et al.). In some implementations, the retaining ring 26 may also be a flexible ring such as described above. In other variants, the optical element 22 may be bonded to the abutment 44 of the flexible ring 126, for example using glue or the like, in which case the retaining ring 26 may be omitted from the optical assembly.

Figure 9A:
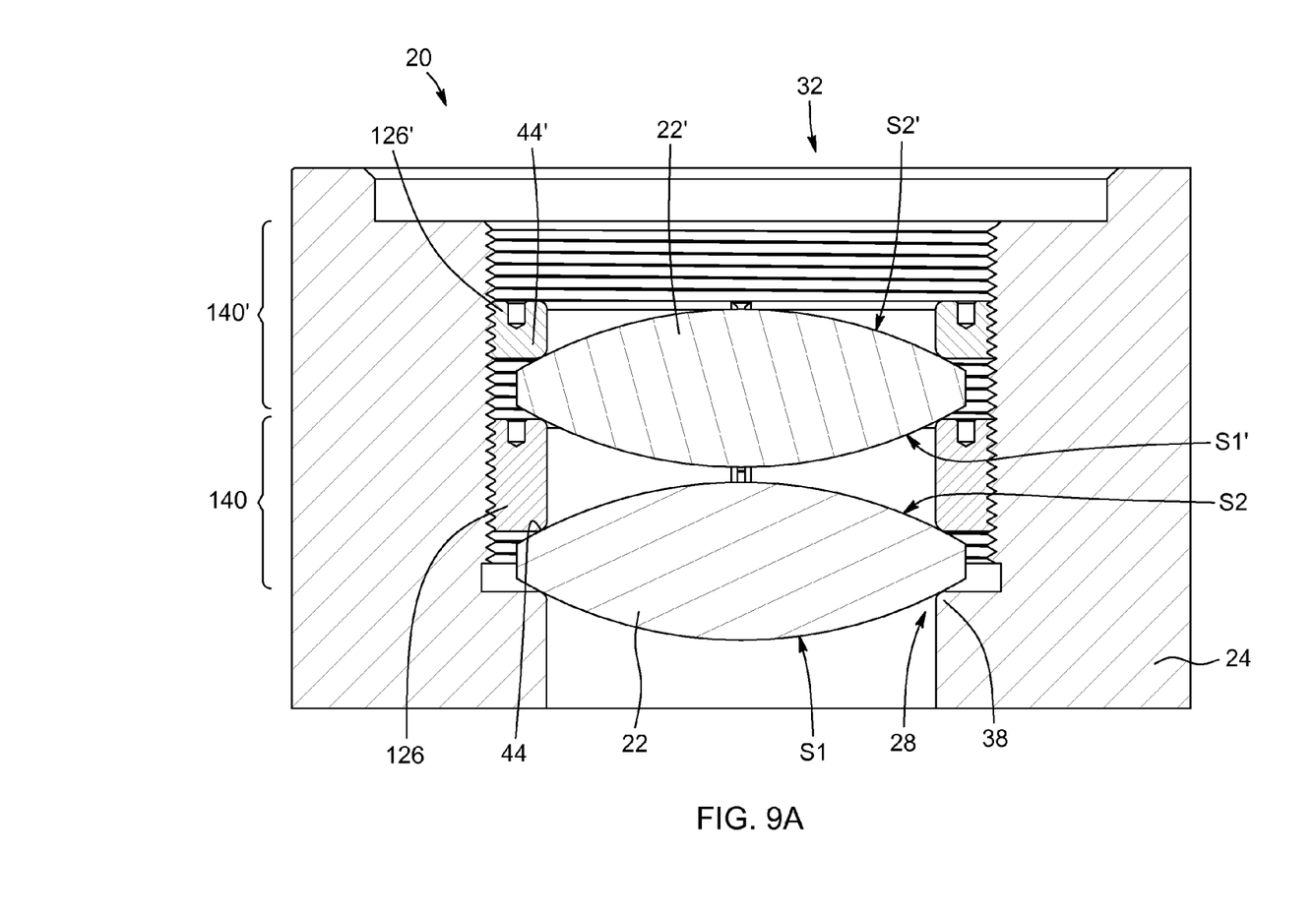
FIGS. 9A and 9B are respectively a cross-sectional and an exploded isometric view of an optical assembly including a plurality of subassemblies mounted in a cascade within the cavity of a barrel.
Figure 9B:
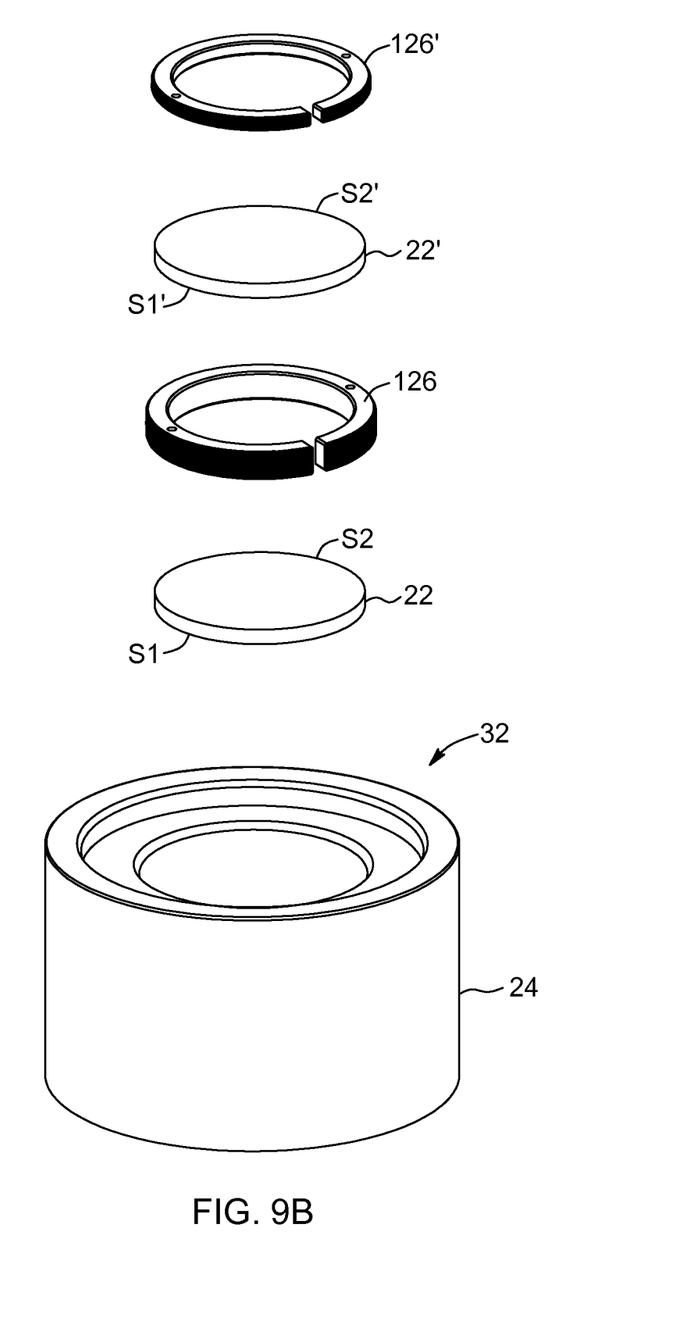

Referring to FIGS. 9A and 9B, there is shown another implementation of an optical assembly 20. In this embodiment, the assembly includes a plurality of subassemblies 140 mounted in a cascade within the cavity 32 of the barrel 24. In the illustrated example of FIGS. 9A and 9B only two subassemblies 140, 140' are shown, but one skilled in the art will readily understand that a greater number of subassemblies could be provided in the same cavity without departing from the scope of the invention.

Each subassembly 140, 140' includes an optical element 22, 22' having opposite first and second surfaces S1, S1' and S2, S2', and further includes a flexible ring 126, 126'. As explained above, the flexible ring 126, 126' includes an abutment 44, 44', which in this case peripherally engages the second surface S2, S2' of the corresponding optical element 22, 22'. The flexible ring 126, 126' of each subassembly 140, 140' has a biased state and is resiliently deformable to a compressed state such as explained above.

In the illustrated implementation, the optical assembly 20 includes a seat 28 provided in the cavity 32. As with previously described embodiments, the seat may be defined by an annular shoulder 38 formed in the inner wall of the barrel 24 and projecting inwardly within the cavity 32, or may alternatively be embodied by any other suitable structure as listed above. In other variants, the seat may be embodied by an additional flexible ring (not shown) having characteristics similar to those of the flexible ring 126, 126' described herein. The seat 28 engages the first surface S1 of the innermost optical element 22, that is, the first optical element 22 of the subassembly 140 inserted in the cavity 32. The flexible ring 126 included in the same subassembly 140 serves to secure the innermost optical element 22 against the seat 28, as explained above. The opposite side of this flexible ring 126 is then used as a "seat" for the optical element 22' of the next subassembly 140'. Advantageously, as the flexible ring 126 is precisely centered within the cavity, it can help to mitigate centering errors on the first surface S1' of the next optical element 22'. In this manner, the first surface S1' of each optical element 22' subsequent to the first one 22 is supported by the flexible ring 126 of the previous subassembly 140 within the cascade. The flexible ring 126 therefore acts as a spacer between consecutive optical elements 22, 22'.

It will be readily understood that the combinations of the illustrated variants and described embodiments are provided by way of example only and should not be limitative of the scope of the invention. For example, although the drawings mainly show optical elements embodied by biconvex and plano-convex lenses, it will be readily understood that the other types of optical elements listed above may be used in combination with any of the illustrated configurations.

Of course, numerous modifications could be made to the embodiments described above without departing from the scope of the invention as defined in the appended claims.

The invention claimed is:

1. An optical assembly, comprising:
a barrel defining a cavity, the barrel having an inner wall provided with a set of barrel threads;
an optical element mounted in the cavity and having opposite first and second surfaces; and
a flexible ring having an abutment peripherally engaging one of the first and second surfaces, the flexible ring having an outer surface provided with a set of ring threads engaging the barrel threads, the flexible ring comprising a gap along a section of the flexible ring and having a biased state in which the ring threads press against the barrel threads, said flexible ring being resiliently deformable to a compressed state in which an engagement of the ring threads and barrel threads allows screwing of said flexible ring within the cavity.

2. The optical assembly according to claim 1, wherein the flexible ring comprises at least one compressible portion opposite the gap.

3. The optical assembly according to claim 2, wherein the ring threads are distributed around the flexible ring according to three ring thread segments projecting outwardly from the outer surface of said flexible ring.

4. The optical assembly according to claim 1, wherein the barrel threads and the ring threads have a thread profile including a load-bearing thread face perpendicular to a center axis of the cavity.

5. The optical assembly according to claim 1, wherein the barrel threads and the ring threads have a thread profile having a triangular shape or a trapezoidal shape.

6. The optical assembly according to claim 1, wherein the optical element is a lens, a mirror, a diffractive optical element or a pinhole.

7. The optical assembly according to claim 1, wherein the optical element comprises:
a sleeve having opposite ends defining said first and second surfaces; and
one or more optical components mounted in the sleeve and centered with respect thereto.

8. The optical assembly according to claim 7, wherein each of the optical components is a lens, a mirror, a diffractive optical element or a pinhole.

9. The optical assembly according to claim 1, further comprising a seat provided in said cavity and engaging the first surface of the optical element, the abutment of the flexible ring engaging the second surface of the optical element, the optical element being thereby secured between the seat and the flexible ring.

10. The optical assembly according to claim 1, wherein the abutment of the flexible ring engages the first surface of the optical element, said abutment thereby defining a seat for the optical element, the optical assembly further comprising a retaining ring engaging the second surface of the optical element, the optical element being thereby secured between the flexible ring and the retaining ring.

11. The optical assembly according to claim 1, wherein the abutment of the flexible ring engages the first surface of the optical element, said abutment thereby defining a seat for the optical element, the optical assembly further comprising an additional flexible ring engaging the second surface of the optical element, the optical element being thereby secured between the flexible ring and the additional flexible ring.

12. An optical assembly, comprising:
a barrel defining a cavity, the barrel having an inner wall provided with a set of barrel threads;
a seat provided in the cavity; and
a plurality of optical subassemblies mounted in a cascade within the cavity, each comprising:
an optical element mounted in the cavity and having opposite first and second surfaces;
a flexible ring having an abutment peripherally engaging the second surface, the flexible ring having an outer surface provided with a set of ring threads engaging the barrel threads, the flexible ring having a biased state in which the ring threads press against the barrel threads, said flexible ring being resiliently deformable to a compressed state in which an engagement of the ring threads and barrel threads allows screwing of said flexible ring within the cavity;
wherein the seat engages the first surface of an innermost one of the optical elements, and the first surface of each subsequent ones of the optical elements is supported by the flexible ring of the previous subassembly within said cascade; and
wherein the flexible ring of one of the subassemblies comprises a gap along a section of the flexible ring.

13. The optical assembly according to claim 12, wherein the flexible ring of the at least one of the subassemblies comprises at least one compressible portion along a section thereof opposite the gap.

14. The optical assembly according to claim 13, wherein the ring threads of the flexible ring of at least one of the subassemblies are distributed around the flexible ring according to multiple ring thread segments projecting outwardly from the outer diameter of said flexible ring.

15. The optical assembly according to claim 12, wherein the optical element of each subassembly is a lens, a mirror, a diffractive optical element or a pinhole.

16. An optical assembly, comprising:
a barrel defining a cavity, the barrel having an inner wall provided with a set of barrel threads;
a seat provided in the cavity; and
a plurality of optical subassemblies mounted in a cascade within the cavity, each comprising:
an optical element mounted in the cavity and having opposite first and second surfaces;
a flexible ring having an abutment peripherally engaging the second surface, the flexible ring having an outer surface provided with a set of ring threads engaging the barrel threads, the flexible ring having a biased state in which the ring threads press against the barrel threads, said flexible ring being resiliently deformable to a compressed state in which an engagement of the ring threads and barrel threads allows screwing of said flexible ring within the cavity;
wherein the seat engages the first surface of an innermost one of the optical elements, and the first surface of each subsequent ones of the optical elements is supported by the flexible ring of the previous subassembly within said cascade; and
wherein the flexible ring of at least one of the optical subassemblies comprises at least one resilient insert along a section of the flexible ring.

17. The optical assembly according to claim 16, wherein the optical element of each subassembly is a lens, a mirror, a diffractive optical element or a pinhole.

18. An optical assembly, comprising:
a barrel defining a cavity, the barrel having an inner wall provided with a set of barrel threads;
an optical element mounted in the cavity and having opposite first and second surfaces; and
a flexible ring having an abutment peripherally engaging one of the first and second surfaces, the flexible ring having an outer surface provided with a set of ring threads engaging the barrel threads, the flexible ring comprising at least one resilient insert and having a biased state in which the ring threads press against the barrel threads, said flexible ring being resiliently deformable to a compressed state in which an engagement of the ring threads and barrel threads allows screwing of said flexible ring within the cavity.

19. The optical assembly according to claim 18, wherein the barrel threads and the ring threads have a thread profile including a load-bearing thread face perpendicular to a center axis of the cavity.

20. The optical assembly according to claim 18, wherein the barrel threads and the ring threads have a thread profile having a triangular shape or a trapezoidal shape.

21. The optical assembly according to claim 18, wherein the optical element is a lens, a mirror, a diffractive optical element or a pinhole.

22. The optical assembly according to claim 18, wherein the optical element comprises:
a sleeve having opposite ends defining said first and second surfaces; and
one or more optical components mounted in the sleeve and centered with respect thereto.

23. The optical assembly according to claim 22, wherein each of the optical components is a lens, a mirror, a diffractive optical element or a pinhole.

24. The optical assembly according to claim 18, further comprising a seat provided in said cavity and engaging the first surface of the optical element, the abutment of the flexible ring engaging the second surface of the optical element, the optical element being thereby secured between the seat and the flexible ring.

25. The optical assembly according to claim 18, wherein the abutment of the flexible ring engages the first surface of the optical element, said abutment thereby defining a seat for the optical element, the optical assembly further comprising a retaining ring engaging the second surface of the optical element, the optical element being thereby secured between the flexible ring and the retaining ring.

26. The optical assembly according to claim 18, wherein the abutment of the flexible ring engages the first surface of the optical element, said abutment thereby defining a seat for the optical element, the optical assembly further comprising an additional flexible ring engaging the second surface of the optical element, the optical element being thereby secured between the flexible ring and the additional flexible ring.

* * * * *